US011307628B2

(12) United States Patent
Rotem et al.

(10) Patent No.: US 11,307,628 B2
(45) Date of Patent: *Apr. 19, 2022

(54) MULTI-LEVEL CPU HIGH CURRENT PROTECTION

(71) Applicant: Intel Corporation, Santa Clara, CA (US)

(72) Inventors: Efraim Rotem, Haifa (IL); Nir Rosenzweig, Givat Ella (IL); Doron Rajwan, Rishon le-Zion (IL); Alon Naveh, Sausalito, CA (US); Eliezer Weissmann, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,769

(22) Filed: May 8, 2017

(65) Prior Publication Data

US 2017/0308146 A1    Oct. 26, 2017

Related U.S. Application Data

(63) Continuation of application No. 13/997,200, filed as application No. PCT/US2011/068120 on Dec. 30, 2011, now Pat. No. 9,652,018.

(51) Int. Cl.
*G06F 1/32* (2019.01)
*G06F 1/3206* (2019.01)
*G06F 1/3203* (2019.01)
*G06F 1/26* (2006.01)

(52) U.S. Cl.
CPC .............. *G06F 1/3206* (2013.01); *G06F 1/26* (2013.01); *G06F 1/3203* (2013.01)

(58) Field of Classification Search
CPC ......... G06F 1/3206; G06F 1/26; G06F 1/3203
See application file for complete search history.

(56) References Cited

U.S. PATENT DOCUMENTS

| 5,790,874 | A  |   | 8/1998  | Takano et al. |
| 6,472,899 | B2 | * | 10/2002 | Osburn ................. G01R 31/30 702/118 |
| 6,519,707 | B2 | * | 2/2003  | Clark ................... G06F 1/3203 713/322 |

(Continued)

FOREIGN PATENT DOCUMENTS

| CN | 101436096 A | 5/2009 |
| WO | 2013/101189 A1 | 7/2013 |

OTHER PUBLICATIONS

Communication pursuant to Article 94(3) EPC received for European Patent Application No. 11878518.7, dated Sep. 14, 2017, 8 pages.

(Continued)

*Primary Examiner* — Santosh R Poudel
(74) *Attorney, Agent, or Firm* — Spectrum IP Law Group LLC (57) ABSTRACT

Methods and apparatus relating to multi-level CPU (Central Processing Unit) high current protection are described. In one embodiment, different workloads may be assigned different license types and/or weights based on micro-architectural events (such as uop (micro-operation) types and sizes) and/or data types. Other embodiments are also disclosed and claimed.

24 Claims, 7 Drawing Sheets

(56) References Cited

U.S. PATENT DOCUMENTS

| | | | |
|---|---|---|---|
| 6,542,106 B1 | 4/2003 | Darmawaskita et al. | |
| 7,337,339 B1 | 2/2008 | Choquette et al. | |
| 7,376,853 B2 | 5/2008 | Canon | |
| 7,598,702 B2* | 10/2009 | Walrath | G06F 1/26 320/107 |
| 7,609,040 B1* | 10/2009 | Jain | H02M 3/1584 323/276 |
| 7,664,971 B2 | 2/2010 | Oh | |
| 8,214,663 B2 | 7/2012 | Floyd et al. | |
| 8,539,269 B2 | 9/2013 | Rotem et al. | |
| 9,092,218 B2 | 7/2015 | Wells et al. | |
| 9,724,716 B2* | 8/2017 | Khoury | B05B 12/008 |
| 2002/0138778 A1* | 9/2002 | Cole | G06F 1/3203 713/330 |
| 2003/0056125 A1* | 3/2003 | O'Conner | G06F 1/26 713/300 |
| 2003/0126476 A1* | 7/2003 | Greene | G06F 1/329 713/300 |
| 2003/0167460 A1* | 9/2003 | Desai | G06F 1/3228 717/151 |
| 2004/0103328 A1 | 5/2004 | Toru et al. | |
| 2005/0088152 A1* | 4/2005 | McClure | G05F 3/247 323/272 |
| 2005/0108075 A1* | 5/2005 | Douglis | G06F 1/3203 705/80 |
| 2005/0210304 A1* | 9/2005 | Hartung | G06F 1/3203 713/320 |
| 2006/0053323 A1 | 3/2006 | Kissell | |
| 2006/0090086 A1* | 4/2006 | Rotem | G06F 1/3203 713/300 |
| 2007/0260895 A1 | 11/2007 | Aguilar et al. | |
| 2008/0022140 A1* | 1/2008 | Yamada | G06F 1/206 713/322 |
| 2008/0155281 A1* | 6/2008 | Savransky | G06F 1/329 713/300 |
| 2008/0201548 A1 | 8/2008 | Przybylski et al. | |
| 2009/0167092 A1* | 7/2009 | Ma | G11C 5/147 307/75 |
| 2009/0300329 A1 | 12/2009 | Naffziger et al. | |
| 2009/0327656 A1* | 12/2009 | Baum | G06F 1/206 712/43 |
| 2010/0115314 A1 | 5/2010 | Sultenfuss | |
| 2010/0169692 A1 | 7/2010 | Burton | |
| 2011/0022857 A1 | 1/2011 | Nussbaum et al. | |
| 2011/0040990 A1* | 2/2011 | Chan | G06F 1/3287 713/300 |
| 2011/0093724 A1 | 4/2011 | Park et al. | |
| 2011/0154066 A1 | 6/2011 | Ravichandran et al. | |
| 2011/0173462 A1* | 7/2011 | Wakrat | G06F 1/26 713/300 |
| 2011/0173477 A1 | 7/2011 | Asaba | |
| 2011/0178652 A1 | 7/2011 | Carter et al. | |
| 2011/0238974 A1 | 9/2011 | Wells et al. | |
| 2011/0302391 A1* | 12/2011 | Guo | G06F 1/3206 712/200 |
| 2012/0023345 A1* | 1/2012 | Naffziger | G06F 1/3206 713/320 |
| 2012/0144221 A1 | 6/2012 | Naffziger et al. | |
| 2012/0159219 A1* | 6/2012 | Huang | G06F 1/3206 713/323 |
| 2012/0254641 A1 | 10/2012 | Rotem et al. | |
| 2013/0111191 A1 | 5/2013 | Murray et al. | |

OTHER PUBLICATIONS

Office Action received for European Patent Application No. 11878518.7 dated Jun. 25, 2018, 8 pages.
Office Action received for Chinese Patent Application No. 201180075959.6, dated Oct. 17, 2016, 7 pages.
Office Action and Search Report received for Taiwanese Patent Application No. 101150741, dated May 9, 2016, 10 pages including 1 page of English translation.
Office Action received for Chinese Patent Application No. 201180075959.6, dated Jan. 28, 2016, 9 pages.
Extended European Search Report received for European Patent Application No. 11878518.7, dated Jul. 28, 2015, 8 pages.
International Preliminary Report on Patentability and Written Opinion received for PCT Patent Application No. PCT/US2011/068120, dated Jul. 10, 2014, 6 pages.
Non-Final Office Action received for U.S. Appl. No. 13/077,618, dated Dec. 26, 2012, 7 pages.
Notice of Allowance received for U.S. Appl. No. 13/077,618, dated May 30, 2013, 8 pages.
International Search Report and Written Opinion received for PCT Application No. PCT/US2011/068120, dated Sep. 21, 2012, 9 pages.
Notice of Allowance received for U.S. Appl. No. 13/997,200, dated Jan. 23, 2017, 8 pages.
Office Action received for U.S. Appl. No. 13/997,200, dated Jun. 15, 2016, 13 pages.
Office Action received for U.S. Appl. No. 13/997,200, dated Aug. 13, 2015, 11 pages.
Office Action received for U.S. Appl. No. 13/997,200, dated Dec. 24, 2015, 15 pages.
Letters of Patent received for Chinese Patent Application No. 201180075959.6, dated Dec. 26, 2017 as Chinese Patent No. 104115091, 3 pages.
Notice of Grant received for Chinese Patent Application No. 201180075959.6 dated Sep. 4, 2017, 4 pages including 2 pages of English translation.
Letters of Patent received for Taiwanese Patent Application No. 101150741, dated Apr. 11, 2017 as Patent No. I578234, 10 pages including 1 page of English translation.
Extended European Search Report received for European Patent Application No. 18208100.0 dated Mar. 27, 2019, 9 pages.
Office Action received for Chinese Patent Application No. 201180075959.6, dated May 3, 2017, 6 pages, including 3 pages of English translation.
Office Action received for European Patent Application No. 11878518.7 dated Jan. 22, 2019, 22 pages.

* cited by examiner

MULTI-LEVEL CPU HIGH CURRENT PROTECTION

RELATED APPLICATIONS

This application is a continuation and claims priority under 35 U.S.C. § 120 of pending U.S. patent application Ser. No. 13/997,200, filed May 16, 2014, entitled ADJUSTING POWER CONSUMPTION OF A PROCESSING ELEMENT BASED ON TYPES OF WORKLOADS TO BE EXECUTED which in turn claims priority under 35 U.S.C. § 371 to International Application No. PCT/US2011/068120 filed Dec. 30, 2011, entitled MULTI-LEVEL CPU HIGH CURRENT PROTECTION. The entire disclosure(s) of these documents are incorporated by reference herein for all purposes.

FIELD

The present disclosure generally relates to the field of electronics. More particularly, an embodiment of the invention relates to multi-level CPU (Central Processing Unit) high current protection.

BACKGROUND

Generally, the maximum current consumption of a device (such as a CPU) is determined by the worse case workload that the device may handle at any time, sometimes referred to as "power virus". Without a protection mechanism, this maximum current may negatively impact chip, package, and system power delivery design.

For example, modern CPU and GPU (Graphics Processing Unit) architectures may implement new functional blocks such as vector operation or accelerator hardware that increase the dynamic range of the power/current and allow much higher power and current "power viruses". This increased "power virus" current may have a severe impact on the design due to a need for higher voltage to compensate for the I*R (where "I" stands for current and "R" stands for resistance) droop which may in turn cause waste of power (i.e., power consumption increases as the voltage guard-bands increase).

There may also be a negative impact on reliability (i.e., the need for higher voltage to compensate for the I*R droop increases voltage levels and reduces device life). Lower turbo frequency may be achieved since the highest operation point (e.g., when all cores in a processor are working) may be determined by the maximum current needed for worse current "power virus". Further, package and power delivery costs may be increased because additional capacitors and better voltage regulators may be needed to supply the higher current. Additionally, the system power delivery capabilities may need to be increased in other components such as the battery and/or PSU (Power Supply Unit).

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may provide efficient and/or flexible power management for computing systems and/or processors. In an embodiment, a multi-level processor high current protection is provided. For example, modern CPU and GPU (Graphics Processing Unit) architectures may implement new functional blocks such as vector operation or accelerator hardware that increase the dynamic range of the power/current and allow much higher power and current "power viruses". More particularly, vector operations may cause a significant increase both in TDP (Thermal Design Power) and in worst case "power virus" scenarios. This causes the average TDP scenario to become further and further away from the worst case "power virus" current. One example for such high power operations is the various types of vector instructions ("AVX" in accordance with at least one instruction set architecture). As mentioned above, techniques discussed herein may also be applied to graphics GPUs which include a number of execution units and/or fixed functional logic.

Because of increased worse case current, new high power vector workloads may also carry a penalty for regular, lower power workloads because of the need to add power headroom. Some solutions may use a single event detection of any AVX operation and have no dependency on data type, e.g., when addressing the potential penalty. This coarse grain detection may use high guard bands to prevent "false positives" which in turn may limit the benefit of the feature in the newer architectures (e.g., with 256 bit wide vector operations when compared with, for example, 64 bit wide vector operations).

In one embodiment, the different workloads may be separated based on micro-architectural events (such as uop (micro-operation) types and sizes) and/or data type. This allows the distinction between multiple types of high current workloads with a lower worse case current, so as to lift or reduce the penalty discussed above and to enjoy the benefits of reduced guard-bands and higher turbo frequencies ("power viruses").

In some embodiments, the separation may be implemented by assigning different "licenses" to workloads based on their (e.g., maximal) current draw. For example, the licenses may be referred to as: Iccp0, Iccp1, Iccp2, Iccp3, etc., e.g., where each license corresponds to a workload with increasingly higher worse case current, for example: Iccp0<Iccp1<Iccp2<Iccp3.

Figure 1:
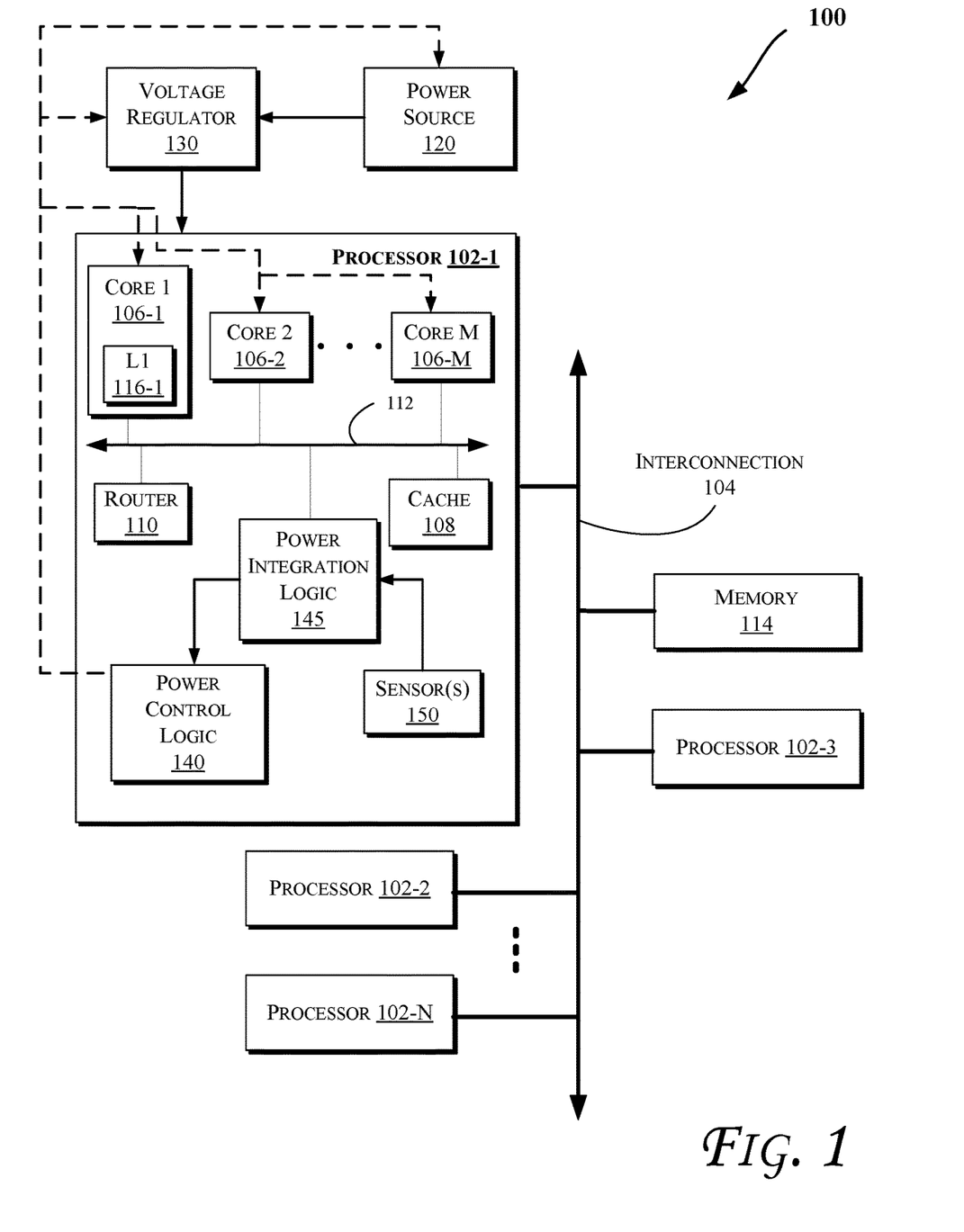
FIGS. 1, 5, and 6 illustrate block diagrams of embodiments of computing systems, which may be utilized to implement various embodiments discussed herein.

Moreover, some embodiments may be applied in computing systems that include one or more processors (e.g., with one or more processor cores), such as those discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores). Power source may be capable of driving variable voltage or have different power drive configurations.

Additionally, while FIG. 1 illustrates the power source 120 and the voltage regulator 130 as separate components, the power source 120 and the voltage regulator 130 may be integrated and/or incorporated into other components of system 100. For example, all or portions of the VR 130 may be incorporated into the power source 120 and/or processor 102. Furthermore, as shown in FIG. 1, the power source 120 and/or the voltage regulator 130 may communicate with the power control logic 140 and report their power specification.

Figure 5:
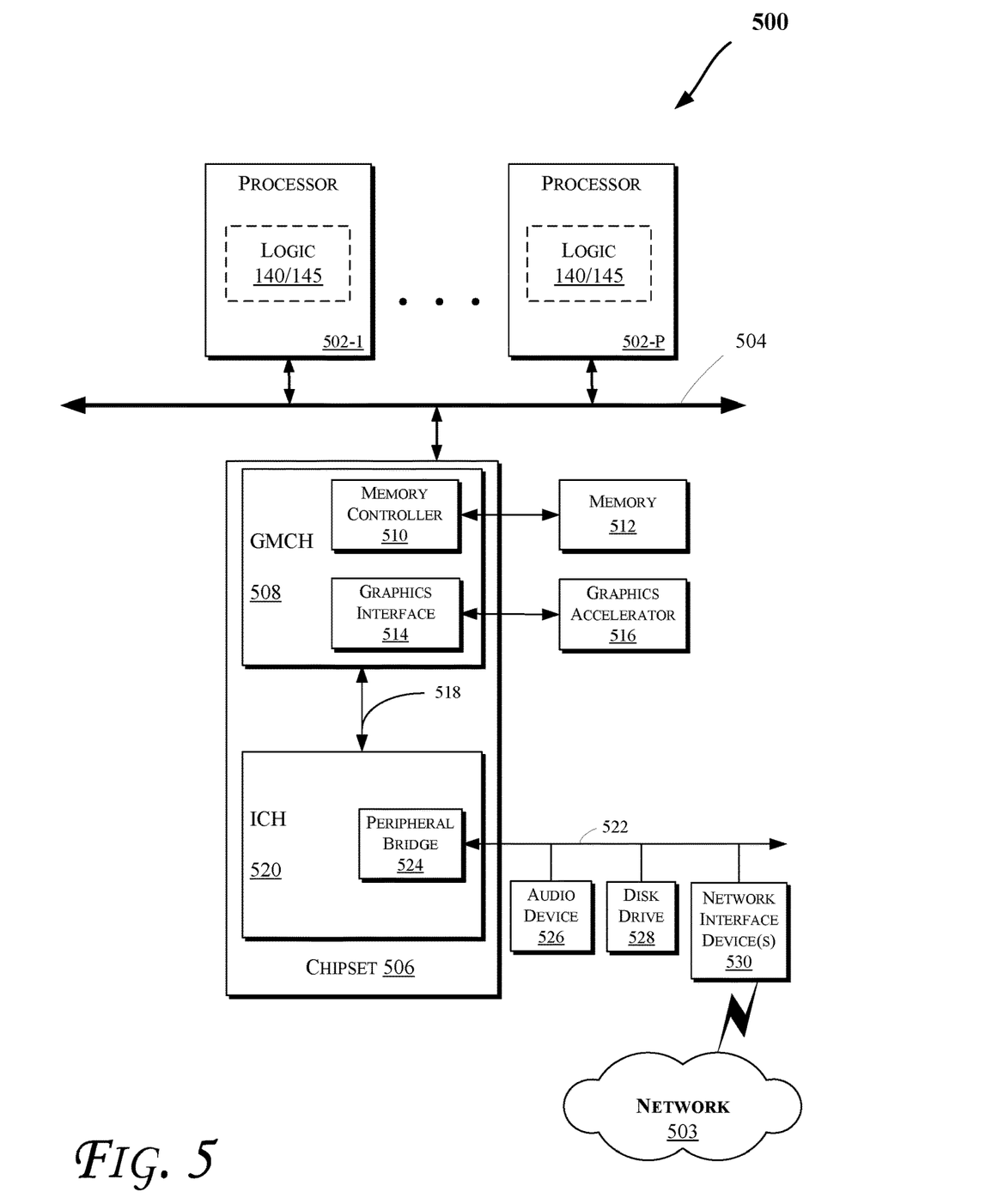
Figure 6:
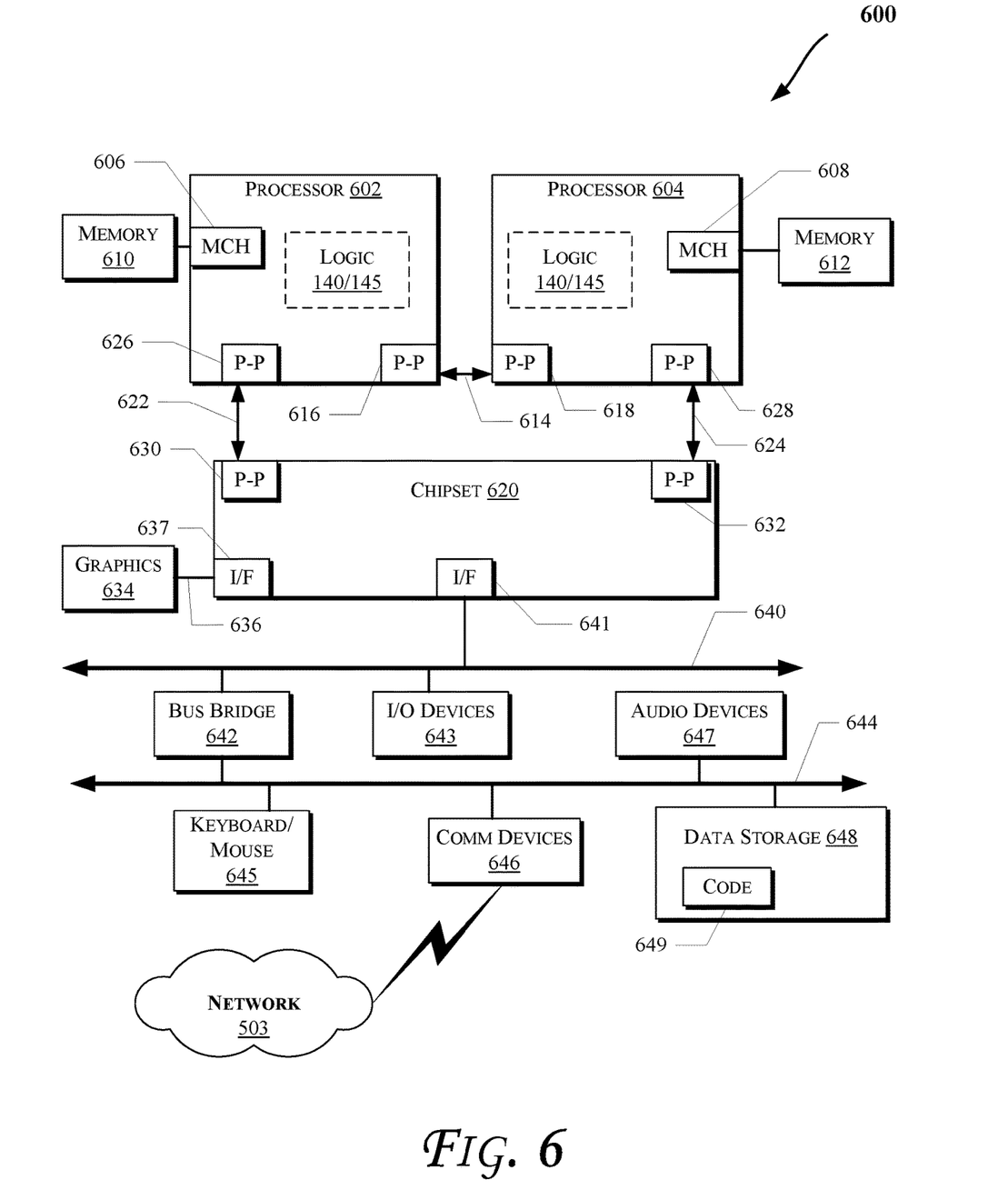

As shown in FIG. 1, the processor 102 may further include a Power Management Unit (PMU) logic 140 to control supply of power to components of the processor 102 (e.g., cores 106). Logic 140 may have access to one or more storage devices discussed herein (such as cache 108, L1 cache 116, memory 114, register(s), or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120. For example, the logic 140 may be coupled to receive information (e.g., in the form of one or more bits or signals) to indicate status of one or more sensors 150 (where the sensor(s) 150 may be located proximate to components of system 100 (or other computing systems discussed herein such as those discussed with reference to other figures including 5 and 6, for example), such as the cores 106, interconnections 104 or 112, etc., to sense variations in various factors affecting power/thermal behavior of the system, such as temperature, operating frequency, operating voltage, power consumption, inter-core communication activity, etc.) and/or information from a power integration logic 145 (e.g., which may indicate the operational status of various components of system 100 such as architectural events and power estimation(s) corresponding to cores 106, which may be provided to logic 145 by the cores 106 directly, or via interconnection 112). In an embodiment, variations may be sensed in such a way to account for leakage versus active power. The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, power consumption, etc. Also, even though components 140, 145, and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Also, even though cores 106 are shown to be processor cores, these can be other computational element such as graphics cores, special function devices, etc.

Figure 2:
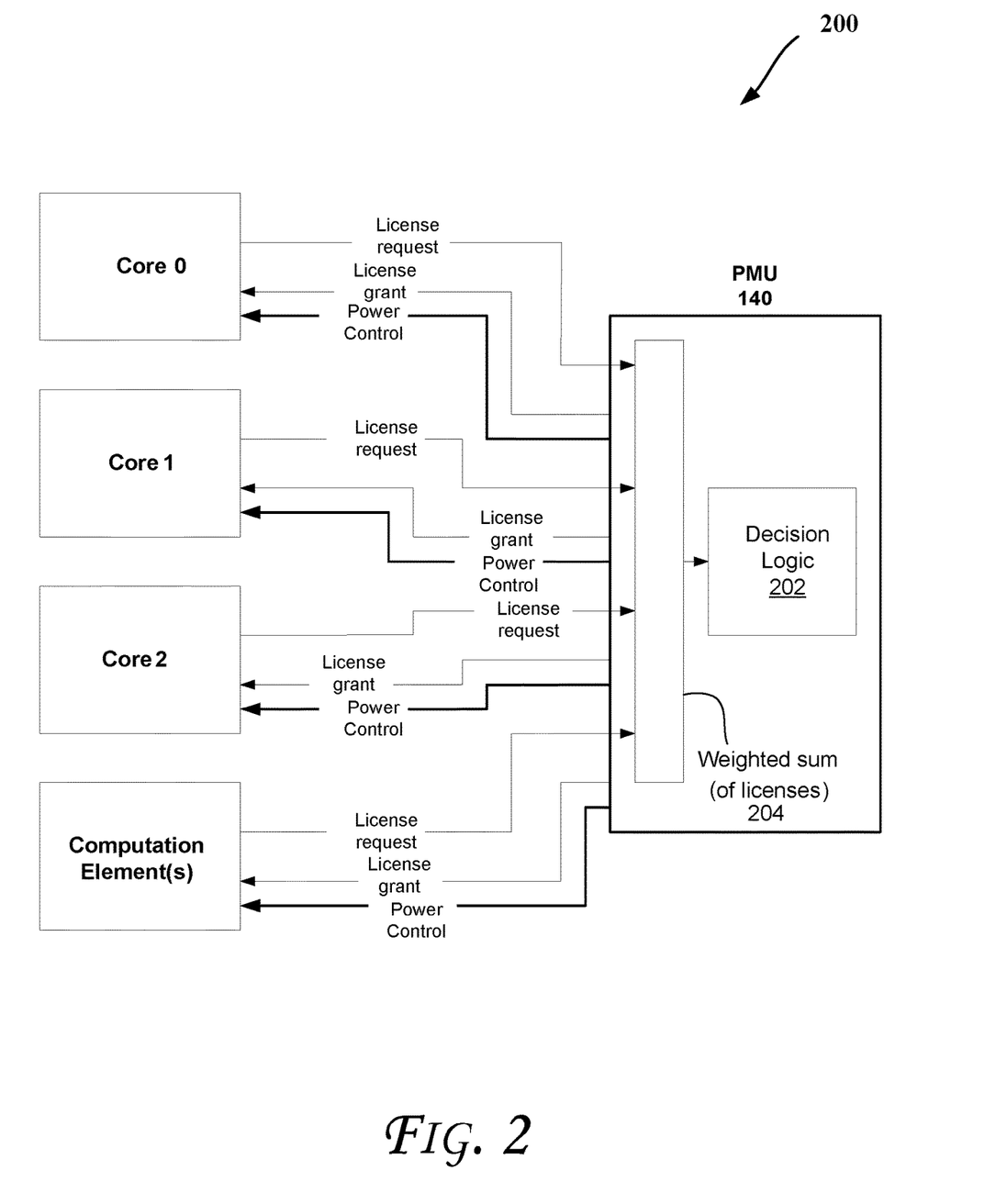
FIGS. 2-3 illustrate block diagrams of computing system components, according to some embodiments of invention.

FIG. 2 illustrates portions of a computing system 200, according to an embodiment. As shown, each processor core (or other computational element) may ask for different licenses for different workloads, and the PMU 140 may consider the overall system configuration/requirements and determine (e.g., via decision logic 202) a way to act accordingly and adjust the power of the core/computational element by actions such as reducing frequency and/or increasing voltage through the granted licenses. For example: (1) the different computational elements may ask for different licenses with signify different levels of "power virus" current; (2) the PMU 140 weighs (e.g., all) the license request from the different elements (e.g., at logic 204), and decide on an action according to the licenses and the elements asking for them (by logic 202). Those actions might be changing frequency according to the license or increasing voltage or any other mechanism that would limit the power; (3) the PMU 140 decides (e.g., by logic 202) according to the license whether to raise guard-bands, or lose some performance, and by how much; and/or (4) the PMU 140 grants each element its appropriate or requested license. In an embodiment, such as shown in FIG. 2, the power control logic 140 may initiate an immediate intermediate power limiting action in response to a license request and initiate a different power limiting action upon license grant.

Figure 3:
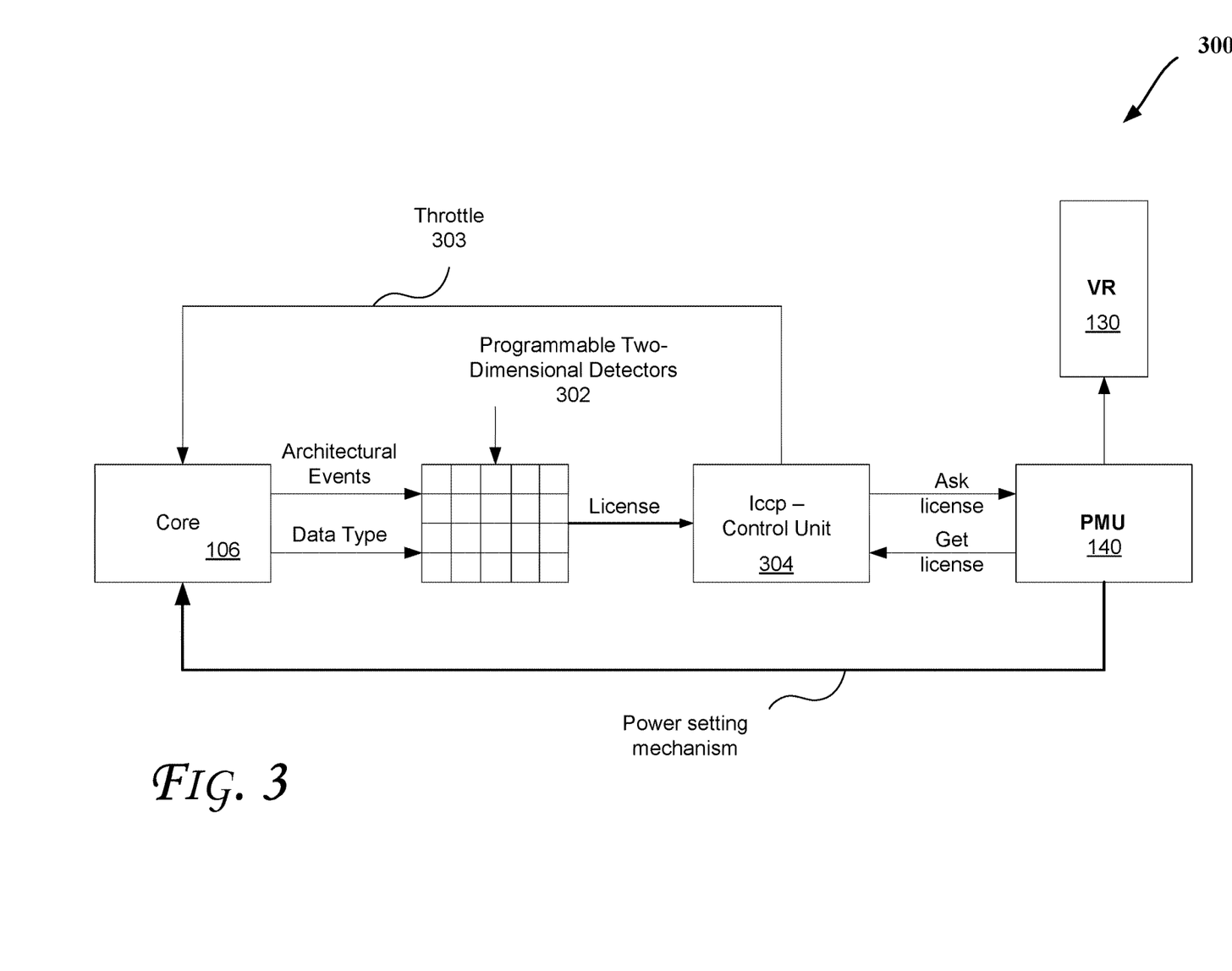

FIG. 3 illustrates portions of a computing system 300, according to an embodiment. In an embodiment such as shown in FIG. 3, each core execution cluster 106 may implement a data collection unit (such as logic 140/145 of FIG. 1). The micro architectural events associated with different types of (e.g., high power) activity are then accumulated and sent to local logic (e.g., which may be provided in each core in an embodiment), together with their data type/width. A two dimensional table 302 takes this information and assigns every cell in the table a different license type and a different weight.

An example of information stored in the two-dimensional table 302 is shown below:

|         | 128   | 256 | 512   |
|---------|-------|-----|-------|
| Other   | ICCP0 | ?   | ?     |
| PFPADD  | ?     | ?   | ?     |
| PFPMULL | ?     | ?   | ?     |
| FMA     | ?     | ?   | ICCP3 |

This table is flexible and may be programmed after testing on silicon. As shown, the table defines the separation between the different workloads in various embodiments. In an embodiment, a threshold is programmed into 302 per license. A weight may be assigned to every architectural event. Once the sum of those weights (e.g., per second in an embodiment) reaches a pre-defined limit, a throttle action 303 is initiated by an Iccp control unit logic 304. The throttling action may be done by changing the clock, changing the configuration of the processor such as pipe width, halting execution of instructions, etc. The throttling may be done per license in an embodiment as shown in FIG. 3. Once the throttle has initiated, the information, including the license is sent to the PMU 140 which evaluates the current conditions and if needed, initiates transition of frequency/voltage or voltage only, uses duty cycles control to lower the power consumption of the core, and/or uses some other mechanism that would let the core run at lower power consumption. Then, the PMU 140 may send the core back the license to run without throttling.

Figure 4A:
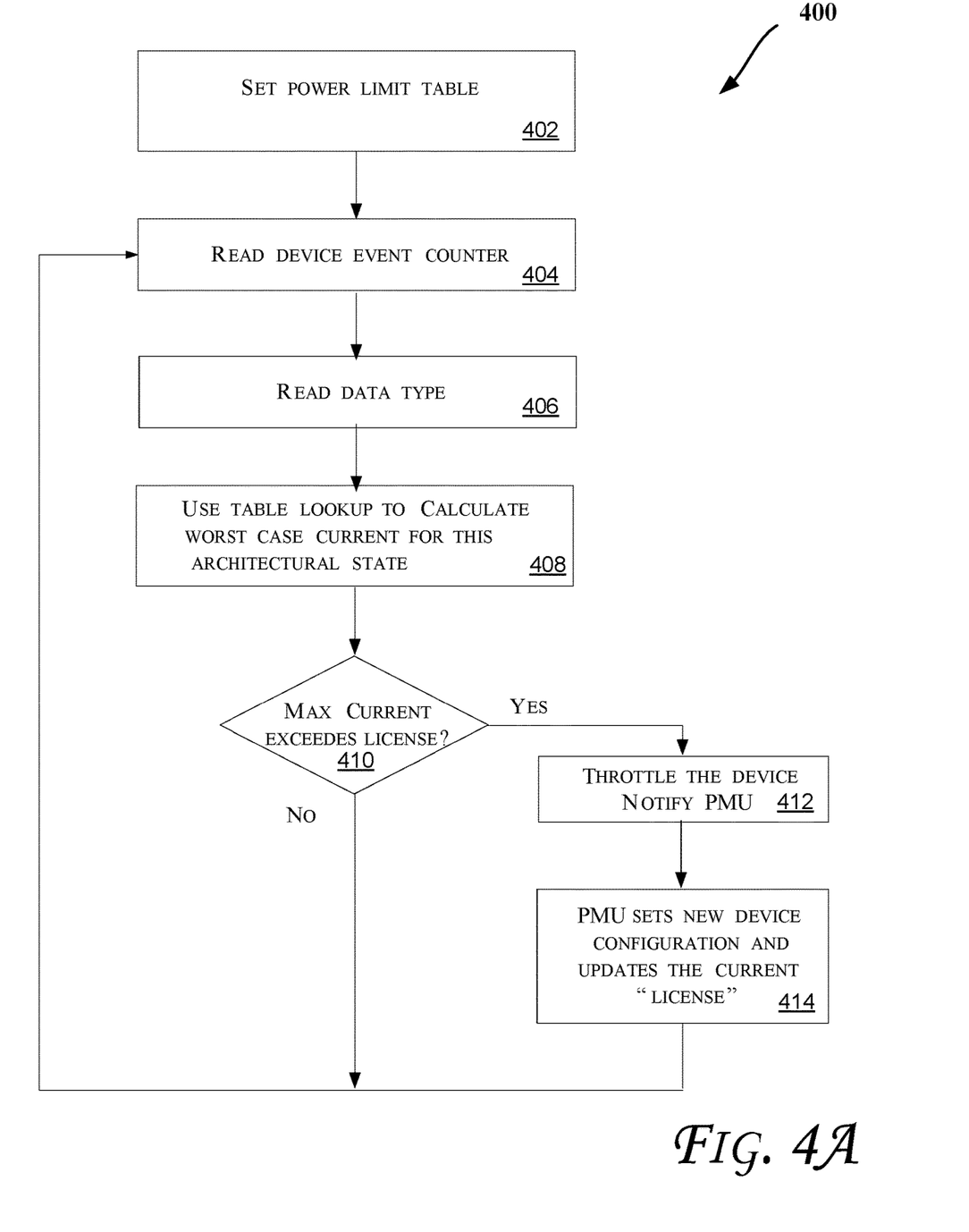
FIGS. 4A and 4B illustrate flow diagrams of methods according to some embodiments.
Figure 4B:
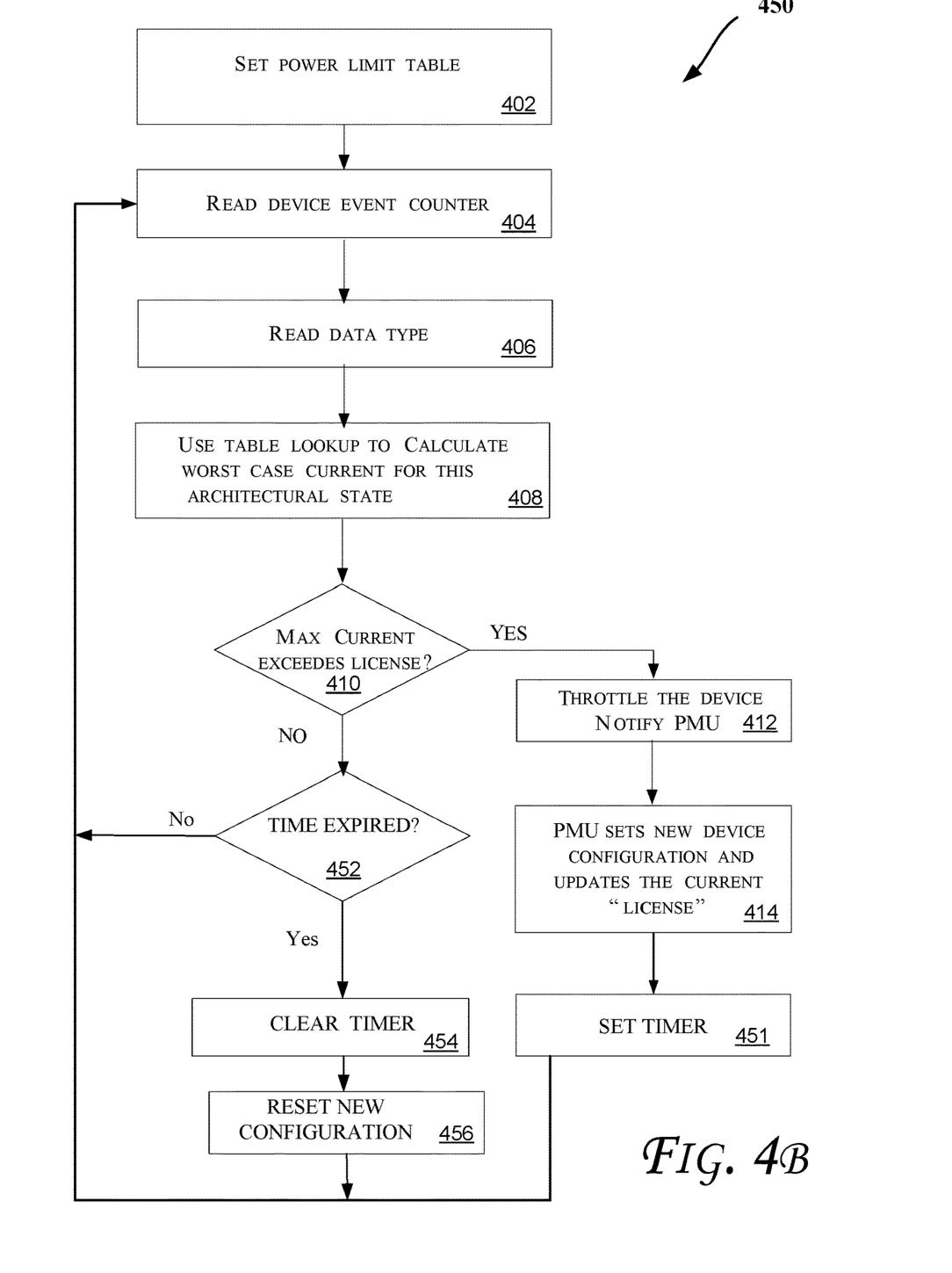

FIGS. 4A and 4B illustrate flow diagrams of an embodiments of methods 400 and 450 to provide a multi-level processor high current protection, according to some embodiments. In an embodiment, various components discussed with reference to FIGS. 1-3 and 5-6 may be utilized to perform one or more of the operations discussed with reference to FIGS. 4A and/or 4B.

Referring to FIGS. 1-4B, at an operation 402, the power limit table (e.g., table 302) may be set, e.g., as discussed with reference to FIG. 3. For example, a list of micro-architectural events is collected in the detection mechanism 302 with their data width (e.g., which are read at operations 404 and 406, respectively). Each event and data width may be assigned a different license type and weight. Several limits (per license) may be related to the relevant micro-architectural events and their data width. At operation 408, the table 302 may be used to calculate the worst case current for the read architectural event/state.

At an operation 410, the detecting mechanism (e.g., logics 302/304) may compares the micro-architectural events collected and their weights to the limit of the appropriate license, e.g., as decided per the table above. If a limit is detected at operation 410, the processor will enter a safe state (with some performance hit) at operation 412, and avoids over current. At an operation 414, an appropriate license request is sent to the PMU 140. The PMU (or logic 202) decides according to the license whether to raise guard-bands, or lose some performance, and by how much. For example, by reducing frequency or increasing voltage. Voltage increase/frequency reduction is dependent on the license in some embodiments. The PMU then issues a matching license to the mechanism to indicate it to stop throttling.

The process of calculating the new voltage/frequency operation point and changing the voltage/frequency may take some time. To ensure minimal performance hit due to throttling and P-State transitions, The Iccp logic 304 may include hysteresis—that means that the Iccp would not ask for a license and will not throttle too frequently, reducing the thrashing of the system and the effect of throttling. An embodiment of a hysteresis method 450 is shown in FIG. 4B. When in throttle, a timer is set to keep the license for a minimum period of time at operation 451. Only when the high current condition ends for a period that is longer than the timer at an operation 452, the timer will be cleared at operation 454 and the configuration will be reset to initial conditions at operation 456. In another embodiment, the hysteresis can be set by different levels of license to increase or decrease the values in the table 302.

Accordingly, multiple licenses are used in order to deal with the greater power range of potential workloads, e.g., due newer or more extensive AVX such as AVX3. As a result, a decision is made regarding the license for every event and data width and the license is assigned based on a two dimensional table 302 of the type of event and its data width.

Some embodiments provide the following features over some existing solutions: (a) reduced guard-band on lower Cdyn (dynamic capacitance) workloads compared to a fixed guard-band; and/or (b) higher turbo frequencies for lower Cdyn workloads.

FIG. 5 illustrates a block diagram of a computing system 500 in accordance with an embodiment of the invention. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. In some embodiments, one or more of the processors 502 may include one or more of the cores 106, logic 140, logic 145, sensor(s) 150, of FIG. 1. Also, the operations discussed with reference to FIGS. 1-5 may be performed by one or more components of the system 500. For example, a voltage regulator (such as VR 130 of FIG. 1) may regulate voltage supplied to one or more components of FIG. 5 at the direction of logic 140.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display, a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600. For example, a voltage regulator (such as VR 130 of FIG. 1) may regulate voltage supplied to one or more components of FIG. 6.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. Also, the processors 602 and 604 may include one or more of the cores 106, logic 140/145, and/or sensor(s) 150 of FIG. 1.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, one or more operations discussed with reference to FIGS. 1-6 may be performed by the processors 602 or 604 and/or other components of the system 600 such as those communicating via a bus 640. Other embodiments of the invention, however, may exist in other circuits, logic units, or devices within the system 600 of FIG. 6. Furthermore, some embodiments of the invention may be distributed throughout several circuits, logic units, or devices illustrated in FIG. 6.

Chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    first one or more circuitries to receive, from a processor, a request to activate a computing block;
    second one or more circuitries to determine an extreme loading condition associated with the computing block;
    third one or more circuitries to cause to change a voltage of the computing block, based at least in part on the extreme loading condition associated with the computing block; and
    fourth one or more circuitries to grant permission to activate the computing block, based at least in part on the change in the voltage of the computing block,
    wherein information stored in memory is to indicate whether the fourth one or more circuitries are to grant permission to activate the computing block, wherein the stored information comprises data corresponding to a first permission associated with a first workload and a second permission associated with a second workload, wherein the first workload is to be executed on the computing block in response to the first permission and the second workload is to be executed on the computing block in response to the second permission, wherein different micro architectural events and their corresponding data widths for the computing block are to be assigned different permission types.

2. The apparatus of claim 1, wherein the apparatus is coupled to a voltage generator that is to supply the voltage to the computing block.

3. The apparatus of claim 1, wherein to determine the extreme loading condition associated with the computing block, the second one or more circuitries are to access a table stored in a memory, the table to store the extreme loading condition associated with the computing block.

4. The apparatus of claim 1, wherein to cause to change the voltage, the third one or more circuitries are to:
    cause a reduction in the voltage.

5. The apparatus of claim 1, wherein to grant permission to activate the computing block, the fourth one or more circuitries are to:
    issue a license or update a license, the license to grant permission to activate the computing block.

6. The apparatus of claim 1, wherein the extreme loading condition associated with the computing block is to correspond to a worst case loading condition associated with the computing block.

7. The apparatus of claim 1, wherein the activated computing block is to execute the first workload in response to the first permission or the second workload in response to the second permission.

8. The apparatus of claim 1, wherein the stored information is to indicate whether each of the first workload and the second workload is one of: a high current draw workload or the low current draw workload.

9. The apparatus of claim 1, wherein each workload is to be assigned a different permission.

10. The apparatus of claim 1, wherein the stored information is to indicate whether each of the first workload and the second workload is a low current draw workload.

11. A system comprising:
    an electrical component;
    a voltage generator to supply load current to the electrical component;
    first one or more circuitries to receive, from the electrical component, a request to enter a first state from a second state;
    second one or more circuitries to determine an extreme loading condition of the electrical component corresponding to the first state;
    third one or more circuitries to cause the voltage generator to change a voltage supplied to the electrical component, based at least in part on the extreme loading condition corresponding to the first state; and
    fourth one or more circuitries to grant permission to operate in the first state, based at least in part on the change in the voltage,
    wherein information stored in memory is to indicate whether the fourth one or more circuitries are to grant permission to activate the electrical component, wherein the stored information comprises data corresponding to a first permission associated with a first workload and a second permission associated with a second workload, wherein the first workload is to be executed on the electrical component block in response to the first permission and the second workload is to be executed on the electrical component in response to the second permission, wherein different micro architectural events and their corresponding data widths for the electrical component are to be assigned different permission types.

12. The system of claim 11, further comprising:
a memory to store a table,
wherein to determine the extreme loading condition of the electrical component, the second one or more circuitries are to access the table, the table to store the extreme loading condition of the electrical component corresponding to the first state.

13. The system of claim 11, wherein the extreme loading condition is a worst case loading condition of the electrical component.

14. The system of claim 11, wherein the extreme loading condition is a worst case load current of the electrical component corresponding to the first state.

15. The system of claim 11, wherein the electrical component is a computing block within a processing core.

16. The system of claim 11, wherein the first, second, third, and fourth one or more circuitries are coupled to the voltage generator.

17. The system of claim 11, wherein the electrical component is to operate in the first state, based at least in part on receiving the permission to operate in the first state.

18. The system of claim 11, wherein to grant the permission to operate in the first state, the fourth one or more circuitries are to issue a license to the electrical component.

19. A non-transitory computer-readable storage medium to store instructions that, when executed by a processor within a computing device, cause the processor to perform one or more operations comprising:
receive, from an electrical component, a request to enter a first state from a second state;
access a table to determine a worst-case load condition associated with the first state;
cause to change a voltage of a load line supplying current to the electrical component, based at least in part on the worst-case load condition associated with the second state; and
grant permission to operate in the first state,
wherein information stored in memory is to indicate whether the fourth one or more circuitries are to grant permission to activate the electrical component, wherein the stored information comprises data corresponding to a first permission associated with a first workload and a second permission associated with a second workload, wherein the first workload is to be executed on the electrical component in response to the first permission and the second workload is to be executed on the electrical component in response to the second permission, wherein different micro architectural events and their corresponding data widths for the electrical component are to be assigned different permission types.

20. The non-transitory computer-readable storage medium of claim 19, wherein the worst-case load condition is associated with a worst-case load current associated with the first state.

21. The non-transitory computer-readable storage medium of claim 19, wherein the table is to store the worst-case load condition associated with the first state.

22. The non-transitory computer-readable storage medium of claim 19, wherein the electrical component comprises a computational block within a processing core.

23. The non-transitory computer-readable storage medium of claim 19, wherein the second state in an off state of the electrical component, and the first state in an activated state of the electrical component.

24. The non-transitory computer-readable storage medium of claim 19, wherein to cause to change one or both the voltage or the frequency of the load line, the processor is to perform one or more operations comprising:
instruct a voltage regulator to change the voltage of the load line.

\* \* \* \* \*